United States Patent
Inagaki

(10) Patent No.: US 7,951,502 B2
(45) Date of Patent: May 31, 2011

(54) FUEL CELL

(75) Inventor: Toshiyuki Inagaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 343 days.

(21) Appl. No.: 12/299,342

(22) PCT Filed: Jun. 15, 2007

(86) PCT No.: PCT/JP2007/062557
§ 371 (c)(1),
(2), (4) Date: Nov. 3, 2008

(87) PCT Pub. No.: WO2007/148770
PCT Pub. Date: Dec. 27, 2007

(65) Prior Publication Data
US 2009/0317688 A1 Dec. 24, 2009

(30) Foreign Application Priority Data
Jun. 20, 2006 (JP) .................................. 2006-170604

(51) Int. Cl.
*H01M 8/24* (2006.01)
(52) U.S. Cl. ........................................ 429/469; 429/467
(58) Field of Classification Search .................... 429/469
See application file for complete search history.

(56) References Cited

U.S. PATENT DOCUMENTS 7,833,678 B2 * 11/2010 Inagaki ........................ 429/511
2007/0042250 A1 * 2/2007 Inagaki ........................ 429/34

FOREIGN PATENT DOCUMENTS

| JP | 62-271364 A | 11/1987 |
|---|---|---|
| JP | 8-45535 A | 2/1996 |
| JP | 08-088018 | 4/1996 |
| JP | 8-115737 A | 5/1996 |
| JP | 2566757 | 10/1996 |
| JP | 11-97054 A | 4/1999 |
| JP | 2000-208163 A | 7/2000 |
| JP | 2002-302785 A | 10/2002 |
| JP | 2004-288618 A | 10/2004 |
| JP | 2005-11742 A | 1/2005 |
| JP | 2005-056814 A | 3/2005 |
| JP | 2005-259409 A | 9/2005 |
| JP | 2006-40770 A | 2/2006 |
| JP | 2006-114362 A | 4/2006 |

* cited by examiner

*Primary Examiner* — John S Maples
(74) *Attorney, Agent, or Firm* — Kenyon & Kenyon LLP

(57) ABSTRACT

Provided is a fuel cell comprising a cell laminate having a plurality of laminated cells, an end plate arranged on the outer side of the laminating direction of the cell laminate, and a spring module interposed between the cell laminate and the end plate for adjusting a compression load on the cell laminate. The spring module includes a coil spring arranged between an upper plate and a lower plate for separating the upper plate and the lower plate from each other by an elastic force. The end plate includes a plurality of load adjusting screws. The spring module is given a load at a plurality of load inputting portions by the load adjusting screws.

6 Claims, 3 Drawing Sheets

FUEL CELL

This is a 371 national phase application of PCT/JP2007/062557 filed 15 Jun. 2007, which claims priority to Japanese Patent Application No. 2006-170604 filed 20 Jun. 2006, the contents of which are incorporated herein by reference.

TECHNICAL FIELD

The present invention relates to a fuel cell having a cell laminate in which power generation cells are laminated.

BACKGROUND ART

In recent years, much attention has been paid to a fuel cell car or the like using, as an energy source, a fuel cell which generates power owing to an electrochemical reaction between a fuel gas and an oxidizing gas.

Such a fuel cell is usually constituted as a fuel cell stack including a cell laminate in which the required number of cells for generating the power owing to the electrochemical reaction between the fuel gas and the oxidizing gas, and end plates arranged on the outer sides of this cell laminate in a laminating direction thereof so as to impart a compressive load adjusted with load adjustment screws to the cell laminate.

Then, in this fuel cell, to impart the uniform compressive load to the cell laminate and decrease the fluctuation of the compressive load, a spring module in which a plurality of springs are arranged between plates is interposed between the cell laminate and the end plate (see Japanese Patent Application Laid-Open No. 2004-288618).

DISCLOSURE OF THE INVENTION

In addition, the above spring module has a structure in which a load is imparted to one point of one plate with one load adjustment screw provided in the center of the end plate. Therefore, the load is unstably applied to the plate, and the compressive load to be imparted to the cell laminate might be non-uniform.

The present invention has been developed in view of the above situation, and an object thereof is to provide a fuel cell capable of stably imparting a load to a pressing device to uniformly impart a compressive load to a cell laminate.

To achieve the above object, a fuel cell according to the present invention is a fuel cell comprising: a cell laminate in which a plurality of cells are laminated; end plates arranged on the outer sides of the cell laminate in a laminating direction thereof; and a pressing device provided between the cell laminate and the end plate so as to adjust a compressive load on the cell laminate, the end plates including a plurality of load imparting portions, the pressing device including a pair of plate members, an elastic member arranged between the plate members so as to separate the plate members from each other owing to an elastic force, and a plurality of load inputting portions to which a load is imparted by the load imparting portions.

According to this constitution, since the plurality of load imparting portions impart the load to the plurality of load inputting portions of the pressing device, the load can stably be imparted to the plate members of the pressing device. In consequence, relative displacement in a plane direction and tilt between the plate members of the pressing device can be suppressed, so that the elastic force of the elastic member can smoothly be exerted to stably impart a uniform compressive load to the cell laminate.

The pressing device has a planar shape longer along one direction (a longitudinal direction) than along the other direction, and the plurality of load inputting portions may be arranged along the longitudinal direction of the pressing device.

In consequence, the load to be imparted to the plate members of the pressing device via the plurality of load inputting portions can be stabilized.

The input center of the load to be imparted via the plurality of load inputting portions may be matched with the elastic force center of the pressing device aligned with the reactive force center of the cell laminate.

According to this constitution, the load can uniformly be imparted to the cell laminate, and additionally the generation of unnecessary moment in the cell laminate can be suppressed.

The reactive force center of the cell laminate may be determined in consideration of at least one of, for example, the outer shape of a separator constituting the cell, the position or the shape of a fluid passage (e.g., a fuel gas passage, an oxidizing gas passage or a refrigerant passage) formed on at least one face side of the separator, the position or the shape of a manifold for supplying or discharging a fluid such as a fuel gas, an oxidizing gas or a refrigerant to or from the fluid passage, the characteristics (e.g., an elastic coefficient) or the position of an adhesive which bonds the separators together, and the characteristic (e.g., the elastic coefficient) or the position of a seal member which seals a membrane electrode assembly constituting the cell together with the separator.

According to the fuel cell of the present invention, the load can stably be imparted to the pressing device to uniformly impart the compressive load to the cell laminate.

BEST MODE FOR CARRYING OUT THE INVENTION

Next, a first embodiment of a fuel cell according to the present invention will be described with reference to FIGS. 1 to 5.

Figure 1:
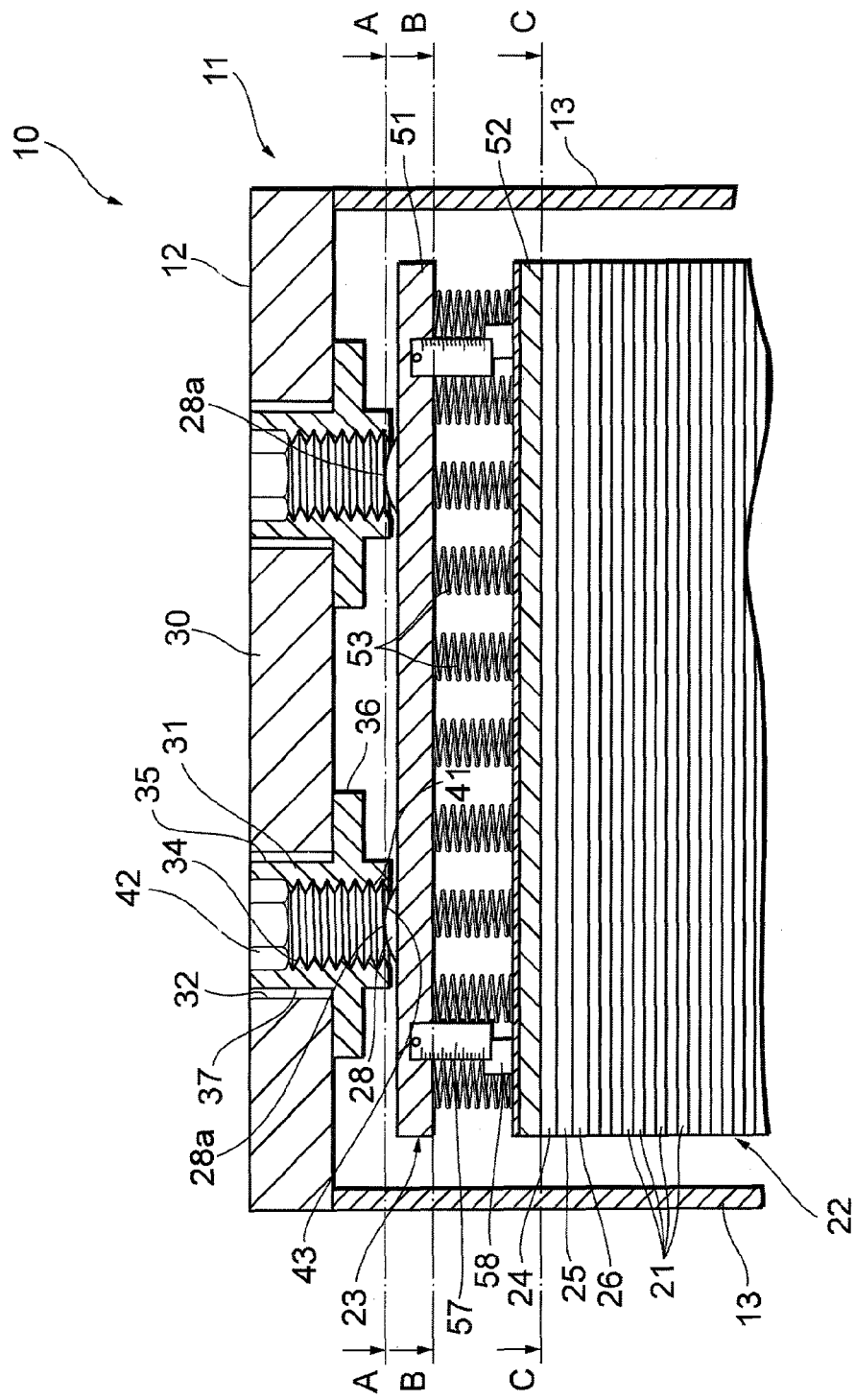
FIG. 1 is a sectional view showing a part of a fuel cell according to the present embodiment.

FIG. 1 shows a fuel cell 10. This fuel cell 10 is applicable to a car-mounted power generation system of a fuel cell car, a power generation system for any type of mobile body such as a ship, an airplane, a train or a walking robot, a stational power generation system for use as power generation equipment for construction (housing, building or the like) or the like, but specifically the cell is used for a car.

The fuel cell 10 has a fuel cell stack 11 and a stack case (not shown) which covers the outer side of this fuel cell stack 11 and which is made of an insulating material such as a synthetic resin. The outer part of the fuel cell stack 11 is constituted by connecting the outer edges of a pair of rectangular end plates 12 (one of them is not shown) to each other via tension plates 13, and these end plates 12 and the tension plates 13 are formed of, for example, duralumin or the like.

Moreover, the fuel cell stack 11 is provided with a cell laminate 22 in which the required number of cells 21 having a rectangular shape as viewed along a plane and receiving the supply of a fuel gas and an oxidizing gas to generate power are laminated between the end plates 12. Then, between one of the end plates 12 and the cell laminate 22, a spring module (a pressing device) 23, an insulating plate 24, a terminal plate 25 and a cover plate 26 are arranged in order from the side of the end plate 12. It is to be noted that the cover plate 26 may be omitted.

It is to be noted that although not shown, between the other end plate 12 and the spring module 23, the insulating plate 24, the terminal plate 25 and the cover plate 26 are arranged in order from the side of the end plate 12.

Then, the end plate 12 on the side provided with the spring module 23 is constituted of a rectangular end plate main body 30 connected to the tension plates 13, and stoppers 31 provided in regions on the inner sides of connecting positions between the end plate main body 30 and the tension plates 13.

The end plate main body 30 is provided with a plurality of through holes 32 extending through the main body in a thickness direction. The stoppers 31 abut on the end plate main body 30 on a spring module 23 side to reinforce the end plate 12 including the end plate main body 30. Each of these stoppers 31 has a cylindrical boss portion 35 in which an internal thread 34 is formed, and a substantially disc-like flange portion 36 which extends externally in a radial direction from the intermediate position of this boss portion 35 in an axial direction to the whole periphery and which has a constant thickness along the same axis as that of the boss portion 35.

Then, the stopper 31 is inserted into the through hole 32 of the end plate main body 30 in one cylindrical portion 37 of the boss portion 35 projecting from the flange portion 36 on one side in the axial direction, and the whole surface of the flange portion 36 is brought into contact with the end plate main body 30. It is to be noted that the length of the cylindrical portion 37 of one of the stoppers 31 in an axial direction is equal to that of the through hole 32 of the end plate main body 30 in the axial direction, and the end face of the cylindrical portion 37 is the same plane as that of the outer end face of the end plate main body 30.

Then, the end plate 12 has a plurality of load adjustment screws (load imparting portions) 41 to be engaged with the internal threads 34 of the stoppers 31, and each of these load adjusting screws 41 abuts on a spherical projection 28 formed on the spring module 23 on the end plate 12 side. Here, each of the load adjusting screws 41 is provided with a recess portion 43 on the projection 28 side, and this recess portion 43 engages with the projection 28.

Moreover, the load adjusting screw 41 is provided with a tool fitting portion 42 into which a tool such as a hexagonal bolt is fitted on the side opposite to the projection 28, and the load adjusting screw 41 is rotated via a tool fitted into this tool fitting portion 42 to adjust a distance between the end plate 12 and the end of the cell laminate 22, thereby adjusting a compressive load to be exerted on the cell laminate 22.

The spring module 23 is formed into a rectangular shape which is longer along one direction (a longitudinal direction) than along the other direction as viewed along a plane, and has an upper plate (a plate member) 51 on the end plate 12 side and a lower plate (a plate member) 52 on the cell laminate 22 side, and a plurality of coil springs (elastic members) 53 are arranged between the upper plate 51 and the lower plate 52.

The upper plate 51 and the lower plate 52 are formed of a metal material such as aluminum having a small specific gravity, and the upper plate 51 is provided with the projections 28 to be brought into contact with the load adjusting screws 41.

Moreover, the spring module 23 has a graduation plate 57 provided on the upper plate 51 and a pointer plate 58 provided on the lower plate 52, and the end position of the pointer plate 58 can be read with the graduation plate 57 to grasp the compressive load to be imparted to the cell laminate 22 via the spring module 23.

Figure 2:
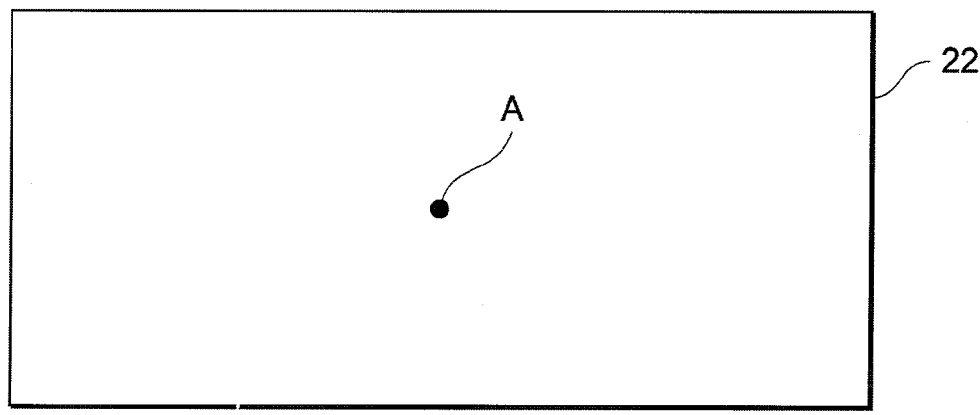
FIG. 2 is a sectional view cut along the A-A line of FIG. 1 and showing the reactive force center of a cell laminate.

Here, FIG. 2 shows a reactive force center A of the cell laminate 22 received by the spring module 23. The position of the reactive force center A of this cell laminate 22 is determined by the shape of a separator constituting the cell 21 (e.g., the outer shape of the separator, the position, the shape or the like of a fluid passage (e.g., a fuel gas passage, an oxidizing gas passage or a refrigerant passage) formed on at least one face side of the separator or a manifold for supplying or discharging a fluid such as a fuel gas, an oxidizing gas or a refrigerant to or from the fluid passage, etc.), the elastic coefficient (Young's modulus) or the position of an adhesive for bonding the separators together or a seal member for sealing a membrane electrode assembly (MEA) constituting the cell 21 together with the separator or the like. The position of the reactive force center is obtained by simulation, calculation or the like.

Figure 3:
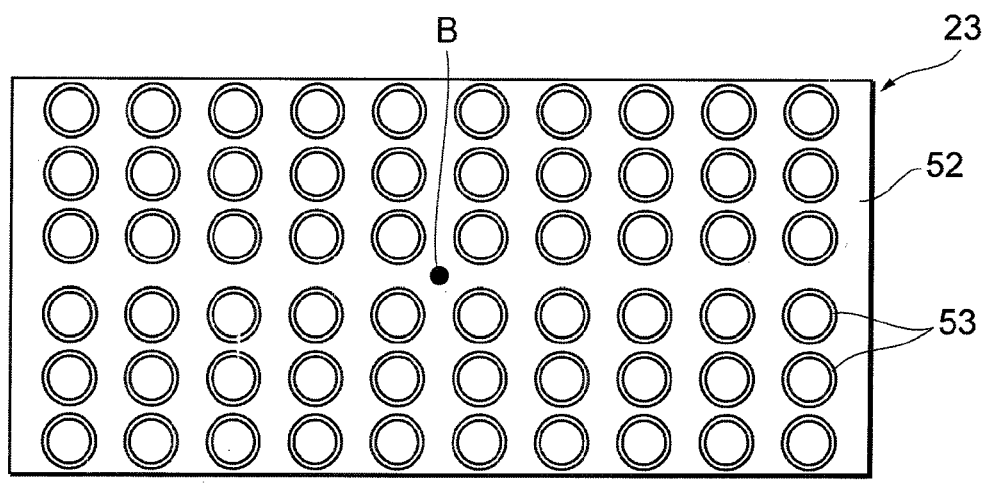
FIG. 3 is a sectional view cut along the B-B line of FIG. 1 and showing the elastic force center of a spring module.

Moreover, FIG. 3 shows an elastic force center B in the spring module 23. This elastic force center B is, for example, the geometric center of the spring module 23 in a case where the coil springs 53 are uniformly arranged between the upper plate 51 and the lower plate 52. However, the elastic force center B constituted of this geometric center does not constantly match the reactive force center A of the cell laminate 22.

Therefore, in the spring module 23, the positions of the coil springs 53 or the spring constants of the coil springs 53 are determined so that the elastic force center B matches with the reactive force center A of the cell laminate 22.

Figure 4:
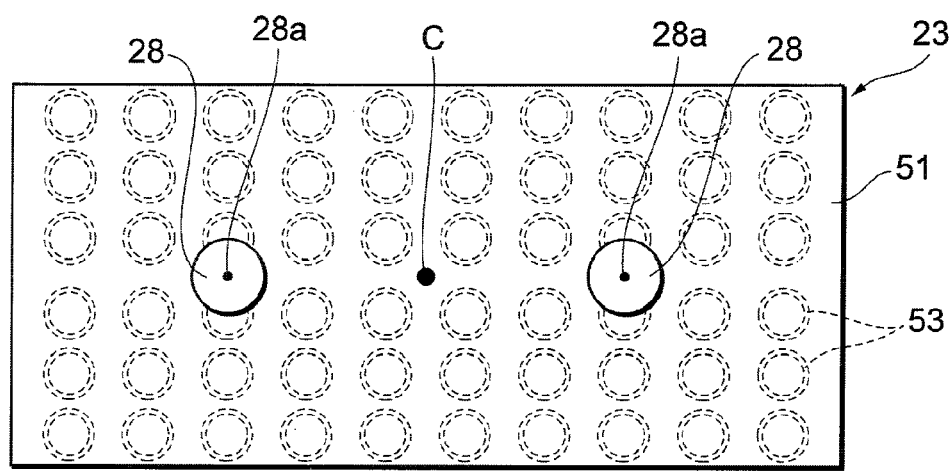
FIG. 4 is a sectional view cut along the C-C line of FIG. 1 and showing a load input center with respect to the spring module.
Figure 5:
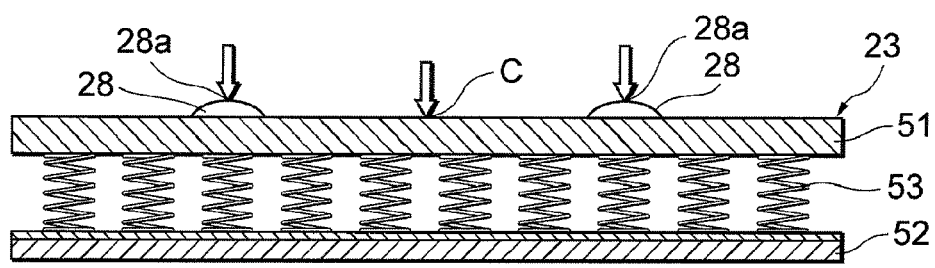
FIG. 5 is a sectional view different from that of FIG. 4, showing the load input center with respect to the spring module.

FIGS. 4 and 5 show a load input center C to the spring module 23. This load input center C is the central position of a load to be imparted (input) to the spring module 23. In the present embodiment, the load input center is the central position of the load to be imparted to two projections 28 by two load adjusting screws 41 provided on the end plate 12. Specifically, the load input center C is a midpoint along a straight line connecting load inputting portions 28a constituted of the centers of the projections 28.

Then, in the spring module 23, this load input center C is matched with the reactive force center A and the elastic force center B of the cell laminate 22. It is to be noted that in a case where the load is imparted to one position, the load inputting portion to which the load is imparted is the load input center C. When the load is imparted to three or more positions, the load input center is the gravity center position of a polygon formed by connecting the respective load inputting portions. Moreover, the spring constants of the coil springs 53 of the spring module 23 can be changed to set the load input center C.

As described above, as a procedure for matching the reactive force center A, the elastic force center B and the load input center C, first the reactive force center A of the cell laminate 22 is obtained by simulation, impractical calculation or the like. Next, the positions of the coil springs 53 or the spring constants of the individual coil springs 53 are adjusted to match the elastic force center B of the spring module 23 with the reactive force center A of the cell laminate 22.

Afterward, the positions of the load inputting portions 28a constituted of the centers of the projections 28 to which the load is imparted are adjusted, and the load is adjusted by the load adjusting screws 41 to match the load input center C of the spring module 23 with the reactive force center A and the elastic force center B.

Then, in the fuel cell 10, the compressive load to be imparted to the cell laminate 22 by the load adjusting screws 41 is uniformed by the spring module 23 having the plurality of coil springs 53 in a planar direction, and the fluctuation of the compressive load due to expansion/contraction during power generation is absorbed.

At this time, according to the fuel cell 10, the load is imparted to the spring module 23 via the plurality of load inputting portions 28a by the plurality of load adjusting screws 41, so that the load can stably be imparted to the upper plate 51 of the spring module 23.

In particular, the portions 28a into which the load is input by the load adjusting screws 41 are arranged along the longitudinal direction of the spring module 23 having a planar rectangular shape which is longer along one direction (the longitudinal direction) than along the other direction, so that the load to be imparted to the upper plate 51 of the spring module 23 via the plurality of load inputting portions 28a can be stabilized.

In consequence, the relative displacement in the planar direction and tilt between the upper plate 51 and the lower plate 52 of the spring module 23 can be suppressed, and the elastic force of the coil springs 53 can smoothly be exerted to stably impart the uniform compressive load to the cell laminate 22.

In addition, the load input center C to be imparted via the plurality of load inputting portions 28a is matched with the elastic force center B of the spring module 23 aligned with the reactive force center A of the cell laminate 22, so that the load can uniformly be imparted to the cell laminate 22 and generation of unnecessary moment in the cell laminate 22 can be suppressed.

It is to be noted that the spring module 23 is not limited to a module including a plurality of coil springs 53, and the module may include one coil spring, or a dish-like spring instead of the coil spring.

The invention claimed is:

1. A fuel cell, comprising:
    a cell laminate in which a plurality of cells are laminated;
    an end plate arranged on an outer side of the cell laminate in a laminating direction thereof; and
    a pressing device provided between the cell laminate and the end plate so as to adjust a compressive load on the cell laminate,
    the end plate including a plurality of load imparting portions,
    the pressing device including a pair of plate members, an elastic member arranged between the plate members so as to separate the plate members from each other owing to an elastic force, and a plurality of load inputting portions to which a load is imparted by the load imparting portions,
    wherein the input center of the load to be imparted via the plurality of load inputting portions is matched with the elastic force center of the pressing device aligned with the reactive force center of the cell laminate.

2. The fuel cell according to claim 1, wherein the reactive force center of the cell laminate is determined in consideration of at least one of the outer shape of a separator constituting the cell, the position or the shape of a fluid passage formed on at least one face side of the separator, the position or the shape of a manifold for supplying or discharging a fluid such as a fuel gas, an oxidizing gas or a refrigerant to or from the fluid passage, the characteristics or the position of an adhesive which bonds the separators together, and the characteristic or the position of a seal member which seals a membrane electrode assembly constituting the cell together with the separator.

3. The fuel cell according to claim 1, wherein the elastic member is constituted of a plurality of coil springs, and the spring constants of the individual coil springs are set so that the elastic force center of the coil springs are matched with the reactive force center of the cell laminate.

4. The fuel cell according to claim 1, wherein the elastic member is constituted of a plurality of coil springs, and the positions of the individual coil springs are set so that the elastic force center of the coil springs are matched with the reactive force center of the cell laminate.

5. The fuel cell according to claim 2, wherein the elastic member is constituted of a plurality of coil springs, and the spring constants of the individual coil springs are set so that the elastic force center of the coil springs are matched with the reactive force center of the cell laminate.

6. The fuel cell according to claim 2, wherein the elastic member is constituted of a plurality of coil springs, and the positions of the individual coil springs are set so that the elastic force center of the coil springs are matched with the reactive force center of the cell laminate.

* * * * *